Aug. 27, 1940.　　　　W. D. BRUNKEN　　　　2,212,493
SIDE BUMPER FOR AUTOMOBILE BODIES
Filed April 24, 1939　　　2 Sheets-Sheet 1
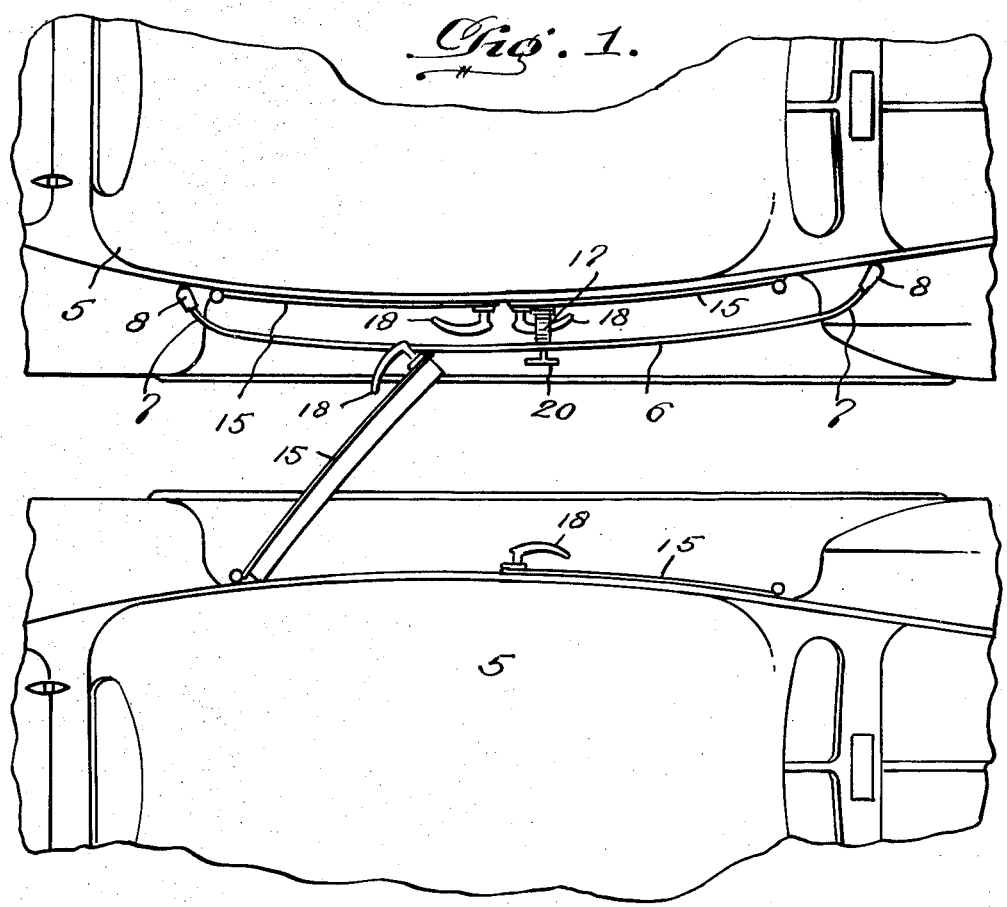
Fig. 1.
Fig. 4.
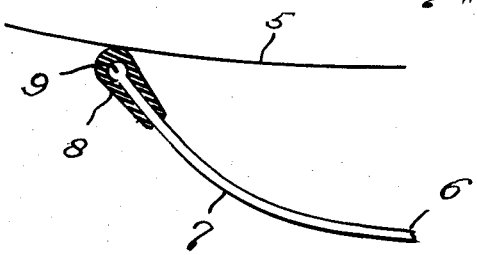
Inventor
William D. Brunken,
By J. Stanley Burch
　　　　Attorney Aug. 27, 1940.    W. D. BRUNKEN    2,212,493
SIDE BUMPER FOR AUTOMOBILE BODIES
Filed April 24, 1939    2 Sheets-Sheet 2

Inventor
William D. Brunken,
By J. Stanley Burch
Attorney

Patented Aug. 27, 1940

2,212,493

UNITED STATES PATENT OFFICE 2,212,493

SIDE BUMPER FOR AUTOMOBILE BODIES

William D. Brunken, Dallas, Tex.

Application April 24, 1939, Serial No. 269,729

2 Claims. (Cl. 293—57)

This invention relates to a bumper adapted to be applied to the side of an automobile body for protecting the latter from being bumped by the doors of adjoining cars when such doors are opened, and where automobiles are parked in adjoining relation.

The primary object of the present invention is to provide a bumper of the above kind having means whereby the same may be quickly and conveniently applied to or removed from the side of the automobile, thereby enabling the bumper to be readily detached while the car is in use and to be readily applied when the automobile is parked.

The present inventon consists in the novel form, combination and arrangement of parts hereinafter more fully described, shown in the accompanying drawings and claimed.

In the drawings:

Figure 1 is a plan view showing a bumper constructed in accordance with the present invention, applied to one of two adjoining cars and illustrating how the same protects the side of the body of such car from bumps when the door of the other car is opened.

Figure 4 is a fragmentary view partly in plan and partly in section, showing the protecting tip provided on the ends of the bumper bar.

Referring in detail to the drawings, the present bumper is adapted to be applied to the side of an automobile body 5 at a point between the running board and the top of the body. It consists of an elongated resilient bumper bar 6 made of spring metal and having the ends thereof turned inwardly or toward the body of the automobile as at 7 for contact with the body at spaced points. These inwardly turned ends are covered with rubber or other protecting tips 8 which are soft and may engage the body of the automobile without marring the finish thereof. Preferably, these protecting tips are fitted on the ends of the bar 6 and the ends of the latter are enlarged as at 9 so that the tips are effectively retained thereon, as shown in Figure 4.

Figure 2:
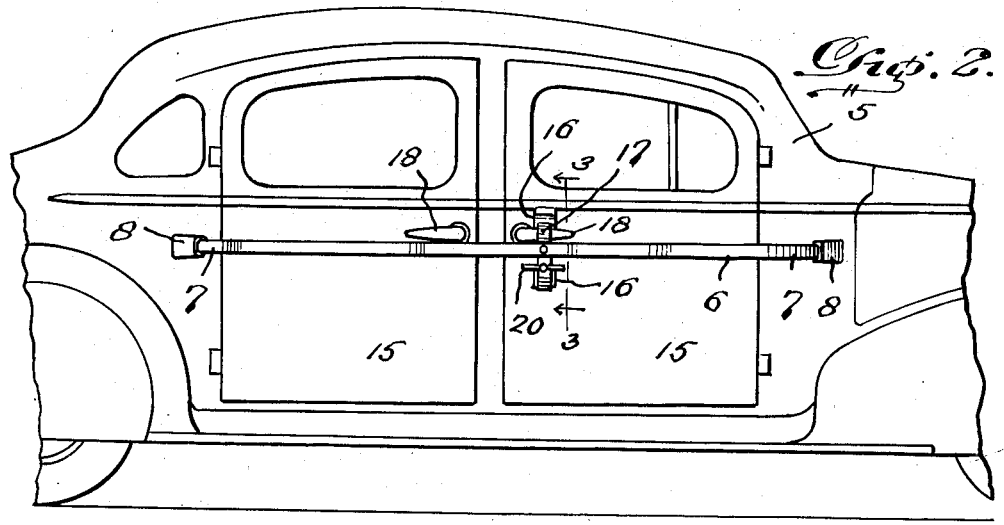
Figure 2 is a side elevational view of the bumper applied to the side of an automobile as illustrated in Figure 1.
Figure 3:
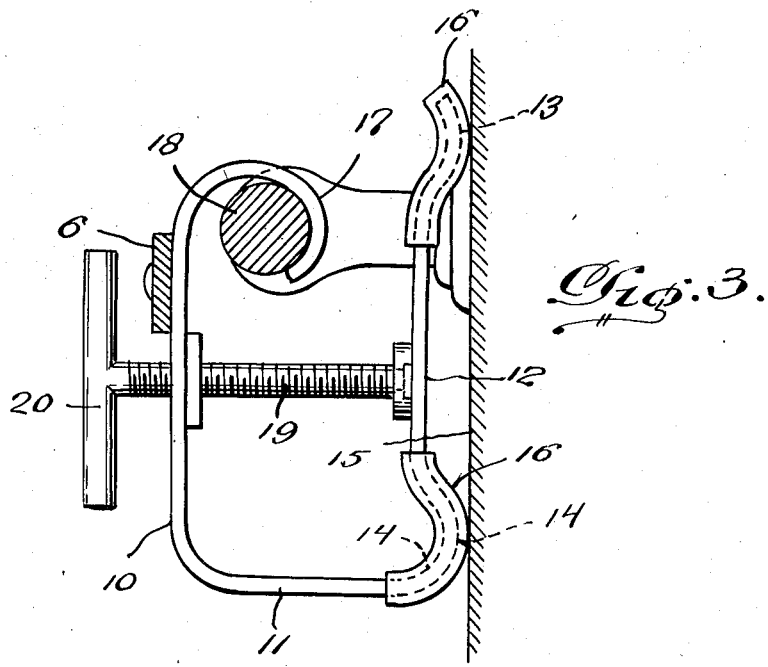
Figure 3 is a section through the device taken on the plane of line 3—3 of Figure 2 and drawn on an enlarged scale to illustrate the preferred form of attaching means for the bumper.

In order to mount the bumper bar in the desired horizontal position at one side of the automobile body 5, I prefer to use an attaching clamp of the form shown more clearly in Figure 3. This attaching clamp consists of a resilient strip of metal formed to provide a vertical outer portion 10, a horizontal inwardly extending lower portion 11, and an inner vertical portion 12 integrally connected. The inner vertical portion 12 has inwardly arched end portions 13 and 14 adapted to engage the door 15 of the automobile at vertically spaced points, the same being covered with tubular cushions 16 of rubber or the like so as to prevent marring of the surface of the automobile door. The upper end of the outer vertical portion 10 is provided with an inwardly directed hook 17 arranged to engage over the latch handle 18 of the door 15, and threaded through the intermediate part of the vertical portion 10 is a screw 19 whose inner end impinges the intermediate part of the inner vertical portion 12 of the clamp. A handle 20 is provided on the outer end of screw 19, and it will be seen that when the screw 19 is retracted the bumper bar 5 may be positioned with the hook 17 of the clamp engaged over the handle 18 of the door latch. The screw 19 is then threaded inwardly so as to spring the outer vertical portion 10 of the clamp outwardly and thereby cause the hook 17 to tightly engage against the inner side of handle 18, the covered ends of the vertical portion 12 being pressed firmly against the door 15. With the inwardly turned ends 7 of the bumper bar also engaging the sides of the automobile body, the bumper bar will thus be effectively mounted in position so as to receive the bumps which would ordinarily be received by the sides of the car, when the door or doors of an adjoining automobile is or are opened as generally illustrated in Figure 1. In this way, the bumper may be readily applied when the automobile is parked and will afford the desired protection at that time. However, when the car is to be used, the screw 19 may be readily retracted so as to permit the outer vertical portion 10 to spring inwardly to its normal position wherein the hook 17 is not retainingly engaged with the handle 18. The bumper bar and clamp may then be lifted and bodily removed so as to be stored in an out of the way place while the car is being used. By the means described, the bumper bar may be conveniently applied or removed as occasion may require, and when the bumper is applied, it affords a very needy protection in an efficient manner. The construction is extremely simple and may be economically manufactured.

What I claim as new is:

1. In combination with an automobile body, a horizontal bumper bar arranged along one side of said body above the running board and having inturned ends impinging the automobile body, means detachably mounting said bumper bar in place whereby the same may be quickly and conveniently applied or removed, said last-named means comprising a clamp fastened to the bumper bar between its ends and having a hook engageable over the latch handle of a door of the automobile, a vertical clamp member arranged to engage the side of said door inwardly of said handle, and means operable to spread the clamp portion so as to cause retaining engagement of said hook with said handle and to simultaneously force the other portion of the clamp into engagement with the automobile door.

2. A side bumper for automobile bodies comprising an elongated resilient bumper bar having inturned ends arranged to impinge the side of the automobile body when arranged horizontally above the running board of the automobile, and means to detachably mount said bumper bar upon the side of the automobile in the aforesaid position whereby the bumper bar may be quickly applied or removed, said last-named means comprising a latch handle and door-engaging clamp carried by the intermediate portion of said bumper bar.

WILLIAM D. BRUNKEN.